(12) United States Patent
Deev

(10) Patent No.: US 9,598,641 B2
(45) Date of Patent: Mar. 21, 2017

(54) APPARATUS AND PROCESS FOR CONTINUOUS CARBONISATION OF WOOD CHIPS OR WASTES AND OTHER CHARRING ORGANIC MATERIALS

(75) Inventor: Alexandre Vladimirovich Deev, Clayton (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 441 days.

(21) Appl. No.: 14/128,518

(22) PCT Filed: Jun. 19, 2012

(86) PCT No.: PCT/AU2012/000704
§ 371 (c)(1),
(2), (4) Date: Dec. 20, 2013

(87) PCT Pub. No.: WO2012/174587
PCT Pub. Date: Dec. 27, 2012

(65) Prior Publication Data
US 2014/0124353 A1 May 8, 2014

(30) Foreign Application Priority Data
Jun. 21, 2011 (AU) .............................. 2011902445

(51) Int. Cl.
*C10B 1/04* (2006.01)
*C10B 49/02* (2006.01)
(Continued)

(52) U.S. Cl.
CPC ............... *C10B 49/02* (2013.01); *C10B 1/04* (2013.01); *C10B 39/00* (2013.01); *C10B 53/02* (2013.01); *Y02E 50/14* (2013.01); *Y02P 20/145* (2015.11)

(58) Field of Classification Search
CPC C10B 1/04; C10B 39/00; C10B 49/02; C10B 49/04; C10B 49/06; C10B 53/02
(Continued)

(56) References Cited

U.S. PATENT DOCUMENTS 1,756,969 A * 5/1930 Bergfeld .................. C10B 1/04
202/99
1,895,284 A * 1/1933 Hay .......................... C10B 1/04
202/215

(Continued)

FOREIGN PATENT DOCUMENTS

BE          836 515 A1    6/1976
FR          621 350 A     5/1927
WO    WO 79/00610 A1     8/1979

OTHER PUBLICATIONS

Communication including extended European Search Report, dated Jan. 30, 2015 by the European Patent Office, in connection with European Patent Application No. 12 80 2033.6, Commonwealth Scientific and industrial Research Organisation.
(Continued)

*Primary Examiner* — Jill Warden
*Assistant Examiner* — Joye L Woodard
(74) *Attorney, Agent, or Firm* — John P. White; Cooper & Dunham LLP

(57) ABSTRACT

The invention relates to an apparatus and a method for the production of charcoal from wood chips or other particulate organic waste material. The quality of charcoal produced is suitable for use in applications such as chemical reagents, fuels, and as absorbents. The reaction vessel defines a flow path extending from the input to the vessel, through to the output from the vessel, in which the thermal decomposition of the organic material progresses as the organic material passes through the reaction vessel. The vessel includes a reaction zone for autogenous reaction of organic material in
(Continued)

a reaction bed of the organic material, and a cooling zone having at least one inlet for supplying cooling gas into the reaction bed and an outlet to extract heated gas from the reaction bed.

20 Claims, 3 Drawing Sheets

(51) Int. Cl.
*C10B 53/02* (2006.01)
*C10B 39/00* (2006.01)

(58) Field of Classification Search
USPC ....... 201/14, 29, 34, 39, 44; 202/95, 99, 121
See application file for complete search history.

(56) References Cited

U.S. PATENT DOCUMENTS

| | | | |
|---|---|---|---|
| 2,289,917 A * | 7/1942 | Lambiotte | C10B 49/04 |
| | | | 201/34 |
| 3,962,045 A * | 6/1976 | Douglas | C10B 1/04 |
| | | | 201/25 |
| 4,095,960 A | 6/1978 | Schuhmann, Jr. | |
| 4,935,099 A | 6/1990 | Weiss et al. | |
| 5,584,970 A * | 12/1996 | Schmalfeld | C10B 53/02 |
| | | | 201/34 |
| 2010/0031571 A1 * | 2/2010 | Ershag | C10B 1/04 |
| | | | 48/123 |

OTHER PUBLICATIONS

International Search Report, mailed Aug. 8, 2012 in connection with PCT International Application No. PCT/AU2012/000704, filed Jun. 19, 2012.
Written Opinion of the International Searching Authority, mailed Aug. 8, 2012 in connection with PCT International Application No. PCT/AU2012/000704, filed Jun. 19, 2012.
Notification Concerning Transmittal of International Preliminary Report on Patentability (Chapter I of the Patent Cooperation Treaty), including an International Preliminary Report on Patentability and Written Opinion of the International Searching Authority, mailed Jan. 9, 2014 by the International Bureau of WIPO in connection with PCT International Application No. PCT/AU2012/000704, filed Jun. 19, 2012.

* cited by examiner

APPARATUS AND PROCESS FOR CONTINUOUS CARBONISATION OF WOOD CHIPS OR WASTES AND OTHER CHARRING ORGANIC MATERIALS

CROSS-REFERENCE TO RELATED APPLICATIONS

This application is a §371 national stage of PCT International Application No. PCT/AU2012/000704, filed Jun. 19, 2012, claiming priority of Australian Patent Application No. 2011902445, filed Jun. 21, 2011, the contents of each of which are hereby incorporated by reference in their entirety.

FIELD OF THE INVENTION

The invention relates to an apparatus and process for low-cost production of charcoal from wood chips or wastes or other particulate organic material, which can be embodied in wide range of sizes and capabilities; with the quality of charcoal produced to be suitable for use in applications including chemical reagents, fuels and absorbents.

BACKGROUND OF THE INVENTION

Replacement of coal products by charcoal in metallurgical, chemical and other industries has many advantages, particularly in regard to the improvement of product quality and environmental benefits. However, the current use of charcoal by industry is limited by its relatively high price, which is mainly due to the cost associated with its production as well as the cost of raw materials. Current charcoal production technologies cannot produce charcoal at prices that are competitive with coal products in most economic environments throughout the world. As such, there is a clear need to develop a new and economically viable method of charcoal production, which is also capable of utilising low-grade ligno-cellulosic material.

The main factors affecting the price of charcoal include: capital costs of plant installation, the type of process (i.e. batch or continuous), the scale of the reactor, the residence time required by material in the reactor, maintenance costs, the cost of raw materials, the energy efficiency of the process and the value retained with by-products.

It is preferable to use wood chips/waste, rather than quality timber logs, as a raw material. While use of quality wood generally results in a high quality charcoal product, use of wood chips and waste is more economically viable and cost effective.

Furthermore, the use of wood chips and wood waste decreases the residence time in a reactor, in comparison with wood logs, as the heating time for wood chips is shorter. However, with the use of wood chips/waste heat transfer to the core of a large mass of wood chip/waste material is slow due to the bulk material possessing low gas permeability and low thermal conductivity. Thus neither heating, by blowing through a hot gas nor externally is efficient for large volumes of material.

There are many large scale commercial processes for producing charcoal. Some of the main processes include the Lambiotte/Lurgi retort system (U.S. Pat. No. 2,289,917), tubular reactor systems with material driven by a screw e.g. Thomsen Retort (U.S. Pat. No. 3,110,652), rotating tube retort systems e.g. Seaman retort (U.S. Pat. No. 1,115,590), multiple heath furnace systems e.g. the Herreshoff furnace (Handbook of charcoal making. *Solar Energy R&D in the European Community. Series E, Energy from biomass*, v. 7 (1985)), fluidised bed pyrolysis reactors, and the Badger-Stafford process (Nelson, W. G. Waste Wood Distillation by the Badger-Stafford Process. *Ind. Eng. Chem.* (1930). No. 4, Vol. 22, pp. 312-315.).

Many of these systems have limitations which prevent synthesis of charcoal at the desired quality for an economically viable price, that is competitive with the cost of coal.

FIG. 1 shows an embodiment of one charcoal production technique known as the Stafford process (U.S. Pat. No. 1,380,262). Stafford found that when wood chips are bone dry (with a moisture content of less than 0.5%) and preheated to at least 150° C., the thermal decomposition of sufficiently large masses of material can be fully autogenous even in the oxygen-free atmosphere (U.S. Pat. No. 1,380, 262). Thus, in comparison to other processes, neither the blowing of hot gasses through the material nor the external heating is needed in order to conduct pyrolysis. In the context of the invention, the term "autogenous" is used herein to describe a process, which spontaneously generates a sufficient amount of heat to be self-sufficient in an oxygen-free atmosphere.

The Stafford process is preferably conducted in a vertical cylindrical continuously operating retort, in which the ingress of gas is prevented during loading and extraction of materials (U.S. Pat. No. 1,380,262).

Wood in the cooler zone of the retort is heated by pyroligneous vapours and gases ascending from the hotter zone. The wood is heated to a temperature corresponding to the point at which the carbonisation reaction becomes vigorously exothermic (this occurs at a temperature of approximately 300° C. for wood). Even limited gas permeability is sufficient for this heating mechanism to proceed, as the overpressure of vapours evolved in the hot zone pushes them towards the gas/vapour outlet located at the top of the reactor. The maximum temperature reached in the Badger-Stafford process is approximately 515° C.

Due to the exothermic nature of the process, once the process is operating heat is only required initially to dry the wood and preheat it to 150° C. prior to the wood entering the retort. Charcoal leaves the retort at approximately 255° C. and is transported straight into a charcoal conditioner, which is a rotating tube with water cooled walls.

The Badger-Stafford process is able to convert wood chips/waste into charcoal, but not sawdust into charcoal, as maintaining minimum required level of the gas permeability of material is important. The smallest wood pieces that can be processed are approximately 2 mm×2 mm×50 mm in size; the estimated residence time for material in the reactor ranges from between 1.5 to 3 hours.

Whilst the Badger-Stafford process offers advantages over the other previously mentioned methods of charcoal synthesis, it also has several shortcomings.

There is no heat recovery from the charcoal as it is cooled i.e. the energy efficiency of the process can be improved.

The process has limited flexibility and controllability i.e. there are no means to increase the temperature to substantially above 515° C. or to reliably maintain a lower temperature, e.g. at 450° C., if required.

There is no efficient control of the heating rate and residence time for every portion of material within the reactor.

Vapours migrate upwards from warmer layers to cooler layers of material and are then extracted, as a result some valuable high boiling point fractions are condensed within these cooler layers of material and cannot be extracted from the reactor.

As organics escape the retort, if maximising the charcoal yield is desirable, there is no opportunity to recycle the organics into the reaction zone to increase the charcoal yield.

The present invention provides an apparatus for the synthesis of charcoal and offers improvements over the Badger-Stafford process. In particular the present invention allows at least one of improved flexibility and controllability of the process, expanded scalability of the process, improved energy efficiency, increased productivity of the reactor, increased charcoal yield, improved quality of liquid products and faster conditioning of charcoal.

Reference to any prior art in the specification is not, and should not be taken as, an acknowledgement or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

According to one aspect of the invention, there is provided an apparatus for the production of charcoal comprising:
- a feeder for supplying a heated organic material to a reaction vessel,
- the reaction vessel for supporting a reaction bed of organic material, and
- at least one discharge port for discharging thermally decomposed organic material from the reaction vessel, the reaction vessel defining a flow path in which the thermal decomposition of the organic material progresses with the organic material through the reaction vessel;
- the reaction vessel comprising:
- a reaction zone for autogenous reaction of organic material in the reaction bed,
- a cooling zone having at least one inlet for supplying cooling gas into the reaction bed and an outlet to extract heated gas from the reaction bed, and
- at least one gas inlet extending into the reaction zone.

Thermal decomposition of the organic material is preferably carbonisation of the organic material and the discharged product is carbonised organic material (charcoal). Condensable pyroligneous vapours and non-condensable pyroligneous gas are also produced and removed from the apparatus through gas outlets in the reaction chamber.

In a preferred form of the invention, the reaction vessel includes additional gas inlets for the introduction of carrier or cooling gases and gas outlets for the removal of condensable vapours and non-condensable gases therefrom. In this form, the invention offers enhanced control over the flow of pyroligneous vapours and heat as compared with the Badger-Stafford process.

In this preferred embodiment, gases enter the reaction zone substantially at a central location in the reaction chamber and move transversely across the flow of material to the periphery of the reaction chamber. In one form of this embodiment, additional gas inlets may also be formed on the lance downstream from the initial gas inlets on the lance or lances. The gases may be an inert or non-oxidising gas which is intended to carry both the pyroligneous vapours and heat generated in the reaction zone of the reactor. This may be done to control the reactor temperature to less than the temperature which otherwise be obtained and also to extract a desirable fraction of pyroligneous vapours generated at a chosen temperature range.

A first gas outlet may be provided in the periphery of the reaction zone. The first gas outlet is to remove the pyroligneous vapours and heat generated in the reaction zone of the reactor and carrier gas supplied to the reaction zone by the lance.

This embodiment can be used when it is desirable to produce charcoal at lower temperature, i.e. with higher than usual content of volatile matter, and also to increase the yield of condensable pyrolysis products.

The additional gas inlets and gas outlets may also be provided at other locations of the reactor shaft, if required.

In alternative embodiments, a heating zone exists above the reaction zone and the pyroligneous gases may be extracted from the heating zone of the reactor at a predetermined temperature and introduced into the reaction zone via the lance outlet. In this way the gaseous organic materials otherwise escaping the reactor and forming a condensable phase will be partially converted into additional charcoal at the expense of liquid product yield.

The gas introduced through the lance may be heated to control the temperature in the reaction zone to a desired predetermined level. Due to the autogenous nature of the carbonisation process, apart from initial start up procedures, injection of heated gas will generally not be required, unless there is a specific need to heat charcoal to substantially above 515° C. to obtain a low volatile matter product.

Another gas outlet may be supplied in the region of the cooling zone of the reactor to remove hot gases. The cooling zone is preferably in a progressive flow path of the organic material from the reaction zone. The cooling gas is preferably a non oxidising gas which is circulated in a counter flow direction to the material.

In another aspect of the invention, there is provided an apparatus for the thermal decomposition of organic material comprising a feeder for supplying a heated organic material to a reaction vessel,
- the reaction vessel having a reaction chamber for supporting a reaction bed of organic material, a flow path along which the organic material progresses through the reaction vessel, the thermal decomposition of the organic material progressing with the organic material through the reaction vessel,
- the reaction vessel comprising
- a reaction zone for autogenous reaction of organic material in the reaction bed having a first gas inlet to supply a first gas into the reaction zone, and a first gas outlet located transversely from the first gas inlet for removing gas from the reaction zone
- a cooling zone having a second gas inlet for supplying a second gas into the reaction bed and a gas outlet for removing heated gas from the cooling zone of the reaction bed, and
- a discharge port for discharging thermally decomposed organic material from the reaction vessel.

According to an embodiment of the second aspect, the first gas inlet may be located centrally of the reaction zone and the first gas outlet peripherally. The first gas inlet may take the form of an outlet in a lance but may also include other forms of gas delivery apparatus which delivers gas centrally directly into the reaction zone. In this embodiment, sufficient amounts of gases and vapours may be produced into the reaction zone to pressurise the reaction vessel to such an extent, that the outflow of gases and vapours through the first gas outlet are spontaneous.

In a third aspect of the invention there is provided a process for the production of charcoal comprising the steps of:
- adding dry organic material to a first end of a reaction vessel whereby the organic material progresses along a flow path through the reaction vessel and is removed from a discharge port at the second end of the reaction vessel;
- heating the organic material in a heating zone of the reaction vessel as it progresses through the reaction vessel to an exothermic heating zone where the temperature of the organic material has reached a sufficient temperature and autogenous decomposition of organic material to charcoal takes place; and
- cooling the charcoal in a cooling zone of the reaction vessel prior to discharge,
- characterised in that external gases are injected into the exothermic reaction zone and pyroligneous gases are removed from outlets in the side of the reaction vessel in the vicinity of the exothermic zone.

If a high-volatile-content charcoal is needed, a cool gas may be introduced into the exothermic reaction zone. This is because the maximum temperature in the reaction zone needs to be limited to below the maximum autogenously attained temperature.

If the charcoal needs to be heated above the maximum autogenously attained temperature to obtain a low-volatile charcoal, then the hot gas needs to be introduced below the exothermic zone, but above the cooling zone. It is not desirable to introduce hot gases into the exothermic reaction zone, as this will reduce the yield of charcoal and the amount of heat generated in the exothermic zone, hence reduce the efficiency of the reaction.

In one preferred form of this aspect of the invention, the external gases are injected through an internal lance having at least one gas outlet in the exothermic or heating zones of the reaction vessel. The external gases may be inert gases, such as nitrogen.

Alternatively or additionally, gases removed from other parts of the process such as from the heating zone of the reaction vessel may be introduced into the exothermic zone or other zones of the process.

The process may further provide cooling gas entering the cooling zone of the reaction vessel. The cooling gas heated in the cooling zone of the reaction zone is removed through secondary gas outlets in the vicinity of the cooling zone of the reaction vessel. These gases may then be used to preheat the organic material prior to loading into the reaction vessel in an apparatus such as a pre-heater or used in other ways to recover heat therefrom.

In the above preferred form the secondary gas outlets may be positioned in an internal lance placed axially in the reaction vessel and/or in the reaction vessel wall in the vicinity of the cooling zone. The internal lance may be the same internal lance which is used to inject external gases into the exothermic zone of the reaction vessel.

DETAILED DESCRIPTION OF THE EMBODIMENTS

It will be understood that the invention disclosed and defined in this specification extends to all alternative combinations of two or more of the individual features mentioned or evident from the text or drawings. All of these different combinations constitute various alternative aspects of the invention.

The apparatus for the production of charcoal of the invention is considered well adapted for an autogenous process for the synthesis of charcoal. In the context of the invention, the term 'autogenous process' is used herein to describe a process, which spontaneously generates a sufficient amount of heat to be self-sufficient in an oxygen-free atmosphere. An autogenous process for the synthesis of charcoal is considered to be the most suitable process for producing large volumes of charcoal from chipped and/or waste wood because:

(A) no external supply of heat to the material is needed in order for the pyrolysis reaction to proceed, as a result, the transfer of heat to the material core does not limit the size of reactor;
(B) the residence time of material in the reactor is reasonably short;
(C) the process is energy efficient, as no high-grade external heat energy is required for the pyrolysis reaction to occur;
(D) the yield of charcoal is high, due to a combination of the high concentration of pyroligneous vapours and their sufficient residence time allowing secondary charcoal formation reactions to proceed to a considerable extent;
(E) vapours and gases leaving the reactor have a higher economic value and are easier to collect, as they are not diluted with circulating hot gases, as is the case with many other processes;
(F) since the process is conducted in oxygen-free atmosphere, there is no burn-out of charcoal, vapours or gases;
(G) the embodiment of this invention is mechanically simple, hence it has low installation and maintenance costs.

Figure 1:
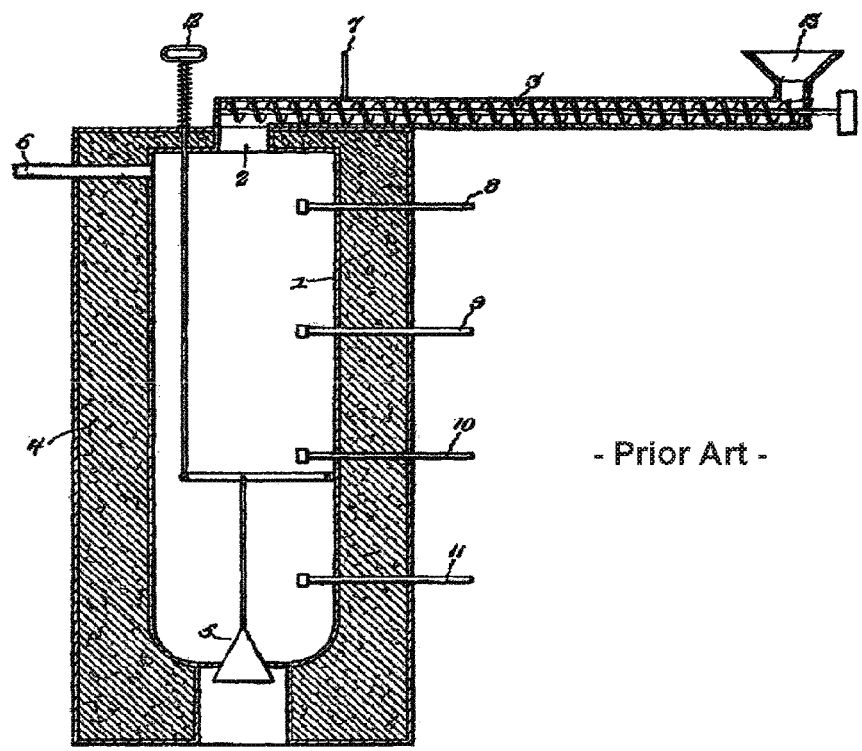
FIG. 1 shows the embodiment of the Stafford process.
Figure 2:
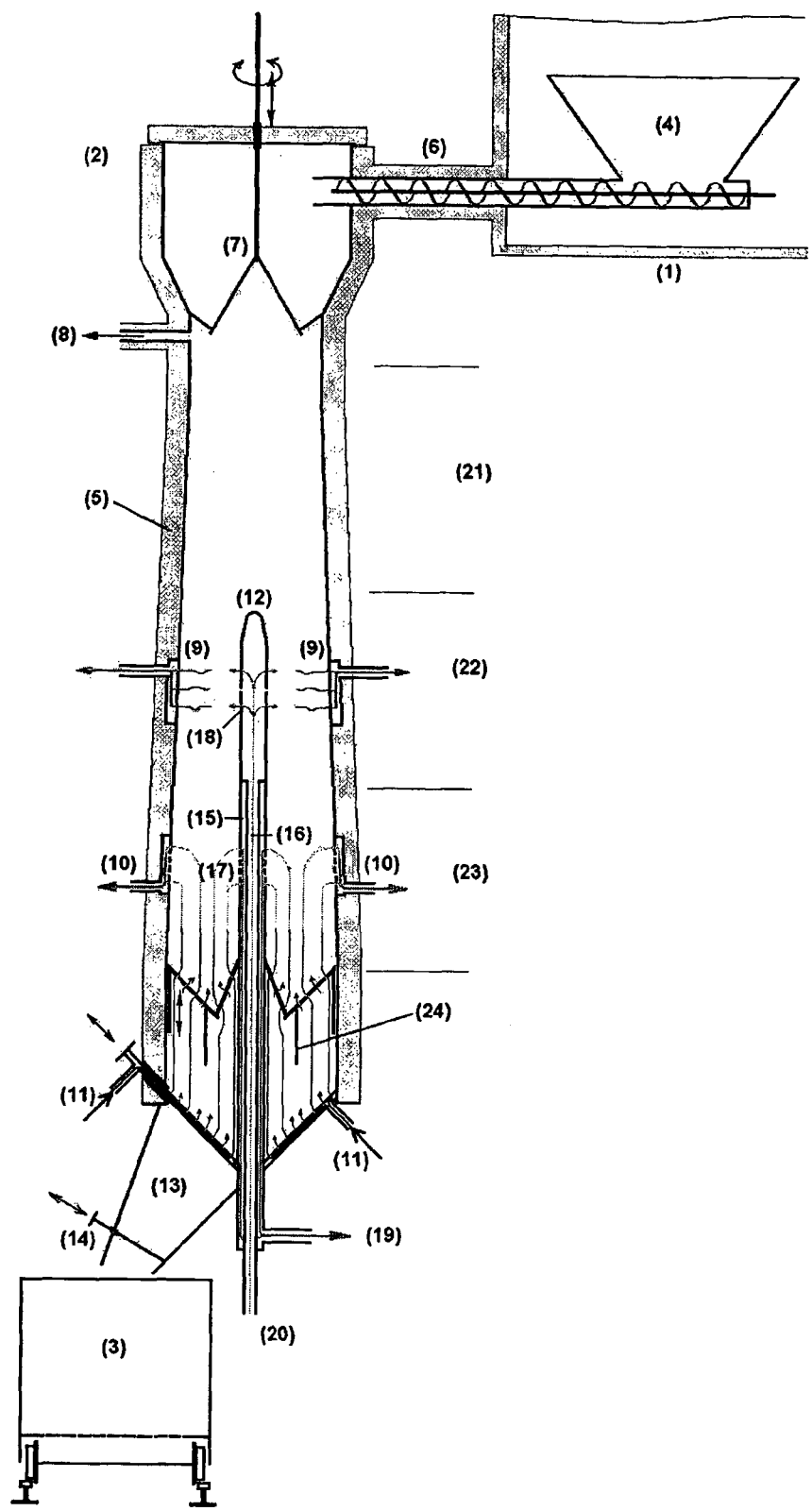
FIG. 2 is a side sectional view of an embodiment of the invention.
Figure 3:
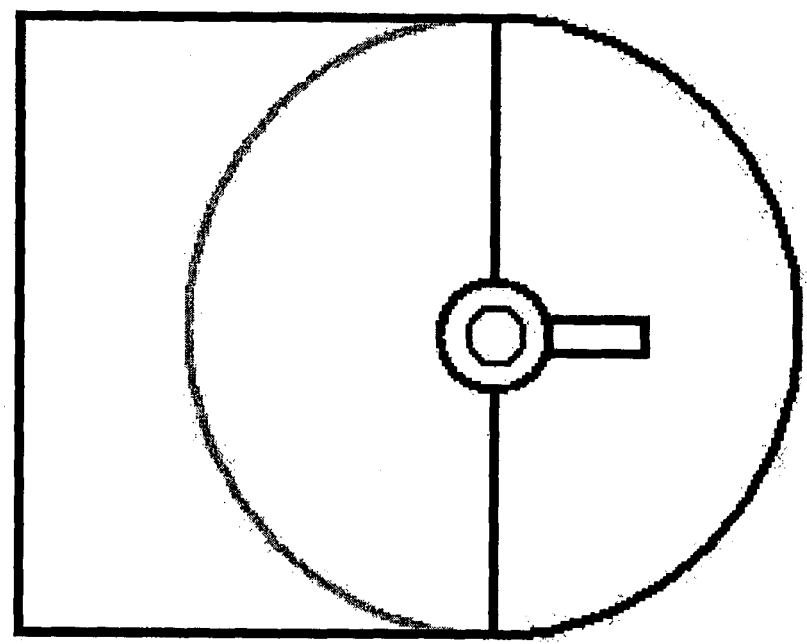
FIG. 3 is a bottom view of the whole vessel shown in FIG. 2.

The present invention provides an apparatus for producing charcoal from an organic raw material. An embodiment of the invention is shown in FIG. 2. The apparatus of this embodiment comprises: a feeder [1] for supplying material to a reaction vessel [2]. The apparatus may further comprise appropriate monitoring and control systems.

The feeder comprises a raw material hopper (4) for receiving dried, preferably bone dry and preheated organic raw material from a drier located upstream of the feeder (4) (not shown in FIG. 2); and a conveyance shown as a screw conveyor [6] for supplying the dried and heated organic raw material to an gas-tight cone valve [7] above the reaction vessel [2]. In the context of the invention, bone-dry organic material has a moisture content of less than 0.5 wt %

The reaction vessel [2] comprises a tapered reaction vessel [2] which diverges from the cone valve towards the base of the reactor. The gas-tight cone valve [7] is mounted for rotation about a central axis to distribute raw material uniformly across the top of the reaction vessel [2]. The reaction vessel [2] is provided with thermal insulation [5], around the external surfaces. The reaction vessel generally has a first section containing a heating zone [21], an exothermic reaction zone [22] and a second section containing a cooling zone [23]. A gas and vapour outlet [8], lateral wall vents [9] in the exothermic reaction zone [22], and lateral wall vents [10] in the cooling zone [23] are provided to remove gas from the reaction vessel.

The reaction vessel [2] is further provided with an initial gas inlet, shown in the form of an internal lance [12] which protrudes from the exterior below the base of the reaction vessel [2] and extends into the exothermic reaction zone for introducing gases into the exothermic zone [22]. In this embodiment, the lance [12] comprises an outer conduit [15] with an inner concentric conduit [16], whereby the outer conduit [15] extends into the cooling zone, and the inner conduit [16] extends into the exothermic reaction zone [22]. While this embodiment shows a single lance, larger vessel designs may require more than one lance. While the embodiment of the invention has been described with reference to a lance, other forms of gas delivery apparatus may be used within the broad scope of the invention. The other forms include a conduit or pipe generally of refractory material which deliver gas centrally into the exothermic reaction zone.

The outer pipe [15] of the lance of the preferred embodiment contains an extraction vent [17] to the cooling zone and is connected to a gas extraction system [19]. The inner conduit [16] contains a supply vent [18] to the exothermic reaction zone [22] and is connected to a gas supply system [20]. The gas supplied through inner conduit [16] may be a non-reactive gas that is not reactive with the contents of the reaction vessel [2]. Alternatively the gas supplied through the inner conduit [16] may be recycled condensable vapours returned to the reaction vessel to increase the yield of charcoal.

The lower section of the reaction vessel further comprises a perforated-wall cone valve to support the reaction bed and to discharge the material when it attains an appropriate level of the thermal decomposition. The outer part of the cone valve is slidable between an open and closed position to allow a predetermined amount of charcoal to drop into the fixed-volume chamber formed by the cylinder [24] attached to the moving part of the cone valve.

The lower section of the reaction vessel also includes cooling gas inlets [11] and at least one charcoal discharge port [13] with associated gate valves [14]. The charcoal carriage [3] is provided and comprises means such as a hopper for receiving charcoal discharged from the charcoal discharge port [13].

Operation

The feeder [1] comprises a hopper [4] for receiving pre-treated organic raw material. Pre-treatment of the organic raw material occurs in a dryer located upstream of the hopper [4] (not shown in FIG. 2) and comprises drying and preheating the material to a moisture content and temperature conducive to the thermal decomposition of the organic raw material in the reaction vessel [2]. Ideally this is a moisture content of less than 0.5 wt % and a temperature greater than 150° C. The organic materials are preferably wood chips or wood waste. The minimum size of the wood chips/waste is the generally the same as that of the Badger-Stafford process discussed earlier. A feeder [6] supplies the dried heated organic raw material to the gas-tight cone valve [7] preceding the reaction vessel [2] by screw conveyor [6] which then passes by gravity into the reaction vessel [2]. To distribute material uniformly across the top of the reactor the cone valve [7] can rotate.

Conversion of organic raw material to carbonised organic material (charcoal) occurs in reaction vessel [2].

Start Up Procedure

The main purpose of the start-up procedure is to heat the material in the reactor and the walls of the reactor to the temperature, which is adequate for the process to run autogenously in an oxygen free atmosphere. In order to initiate the autogenous decomposition, the temperature of dry material placed into exothermic zone of the reaction vessel needs to be raised to approximately 400 to 500° C. For start-up both oxidising (e.g. air) and non-oxidising gas may be blown into the reactor to raise its temperature. However, blowing air may be more efficient/viable, as combustion of material will provide heat, which otherwise has to be taken from an external source. Hot gas with the temperature of approximately 500° C. is introduced into exothermic reaction zone [22] preferably through the external gas ports [16] in the lance or conduit [15] and gas outlets [10] in the walls of the reaction vessel may be used to introduce hot gases and combust part of the organic material during the start up phase. The preferred hot gas is heated air.

The outflow of the gas rising up the reaction vessel through the heating zone preferably occurs through the gas outlet [8]. In the case of blowing hot air, when combustion of the dry wood in the exothermic reaction zone is initiated, the combustion products can also be removed from the reactor through the gas outlet [8]. The cooling gas inlets [11] need to be closed during this operation to prevent the combustion process spreading downwards instead of spreading upwards. It is preferable to close the vapour outlets [9] and the inert gas inlet [20] as well, so the combustion products will sweep through and pre-heat the material placed in the heating zone instead of leaving the reactor through the vapour outlets [9] and inert gas inlet [20]. The amount of air (gas) injected needs to be tightly controlled to prevent the overheating of the reaction vessel. When the temperature of the material placed in the reaction zone [22] reaches approximately 500° C., the flow of start-up gas into the reactor should be stopped and any ingress of air into the reactor should be prevented. The reaction vessel [2] then may be operated in the autogenous continuous mode.

Under 'normal operation' mode, the temperature in the exothermic reaction zone is not controlled by any means, i.e. the temperature rises to the maximum level it can attain for the given reactor design and the chemical properties of the material used (e.g. wood species). However, the circulation of nitrogen gas within the cooling zone is used to accelerate cooling, to cool the charcoal to lower temperatures (than those otherwise would be, thus reducing the requirements to the conditioning of charcoal) and to recover the heat from the charcoal being cooled.

To enable the heat recovery (and cooling) of charcoal, cool nitrogen gas enters through the inlets [11], in counter-flow with the charcoal in the discharge compartment (below the valve [24]) and the charcoal in the cooling zone. The heated nitrogen leaves the reactor through the gas outlets [17] and [19].

The nitrogen leaving the reactor through the outlets [17] and [19] may be heated up to 500 C, and therefore it may be a source of reasonably high-grade heat for various purposes. This is contrast to the Badger-Stafford process where charcoal was cooled by natural heat loss through the walls of the reactor and hence had no effective recovery of heat from the charcoal.

In continuous mode, the reaction vessel [2] converts the organic raw material into charcoal through an autogenous decomposition process whereby the decomposition process is a carbonisation process that progresses as the organic raw material advances from the entrance to the exit of the reaction vessel. The reaction vessel comprises a series of reaction zones that the material passes through. In this embodiment, three reaction zones have been designated; a heating zone [21], an exothermic reaction zone [22] and a cooling zone [23].

The organic material is fed into the heating zone of the reaction vessel where the material is heated by rising gases so that as it progresses to the exothermic zone of the reaction vessel [2], it is at a temperature where autogenous decomposition of the organic material to charcoal takes place.

Hot gas is introduced into exothermic reaction zone [22] preferably through the external gas ports [17] in the lance or conduit [15]. Pyroligneous gases and heated external gases introduced through gas ports [17] may be removed through gas outlets [10] in the walls of the reaction vessel in the vicinity of the exothermic reaction. The flow of gases from the gas ports [17] in the lance to the gas outlets [10] provides a means to control the temperature in the exothermic zone, allows for the removal of pyroligneous gases which may be a by-product and maintains permeability in the reaction bed. This assists in preventing over compaction of the reaction bed and maintains the ability to control the product quality and the temperature in the reaction bed.

Cooling gas enters the cooling zone of the reaction vessel. The cooling gas heated in the cooling zone of the reaction zone is removed through secondary gas outlets in the vicinity of the cooling zone of the reaction vessel. These gases may then be used to preheat the organic material prior to loading into the reaction vessel in an apparatus such as a pre-heater or used in other ways to recover heat therefrom. The secondary gas outlets may be positioned on the internal lance positioned axially in the reaction vessel and/or in the reaction vessel wall in the vicinity of the cooling zone. The internal lance may be the same internal lance which is used to inject, external gases into the exothermic zone of the reaction vessel.

The present invention allows control of gas and vapour flow throughout the reaction vessel [2]. The gas and vapour outflow can be controlled by any combination of the gas and vapour outlet [8] in the first section of the reaction vessel in the region of the heating zone [21], lateral wall vents [9] in the exothermic reaction zone [22], lateral wall vents in the cooling zone [10] and the extraction of gases from the cooling zone [23] through the extraction vent [17] of the outer conduit [15] of the lance [12]. The gas inflow may be controlled using the cooling gas inlets [11], and the supply of the non-reactive gas through the supply vent [18] of the inner conduit [16] of the lance [12]. This control over the gas flow throughout the various reaction stages of the reaction vessel [2] allows the temperature profile and pressure in the reaction vessel and the reaction bed to be controlled. This control also permits the utilisation of heat withdrawn from the cooling zone otherwise wasted as well as the extraction of a desirable fraction of pyroligneous vapours generated at a chosen temperature range. As such, this production method has high energy efficiency and allows control over the composition of the final carbonised organic product.

The gas inlets and gas outlets may also be provided at other locations of the reactor shaft, if required. For example, the gas may be extracted from the heating zone of the reactor at a predetermined temperature and introduced into the reaction zone via the lance outlet 18. This way the organic materials otherwise escaping the reactor and forming a condensable phase will be partially converted into additional charcoal in expense of liquid product yield.

As material passes through the heating zone [21], it is heated to a temperature at which the carbonisation reaction becomes exothermic. The organic material in the 'heating zone' is heated by pyroligneous vapours that may ascend from subsequent zones.

Thermal energy from an external source is not required to progress the reaction in the reaction vessel [2]. The heat energy conveyed to the heating zone [21] can be controlled by controlling the flow of pyroligneous vapours to that zone.

As material passes through the exothermic reaction zone [22], the organic material decomposes through an autogenous carbonisation process. This converts the organic material into carbonised organic material (charcoal), pyroligneous vapour and thermal energy. The pyroligneous vapour can ascend to higher zones in the reactor conveying thermal energy. The pyroligneous vapour can be extracted from the exothermic zone through lateral wall vents [9] that line the walls of the reaction vessel [2] in the exothermic reaction zone [22]. This allows extraction of the pyroligneous vapour in the radial direction as viewed from the top. This control over the direction of the mass flow of pyroligneous vapour allows the rate and degree of heating to be controlled. The pyroligneous vapour conveys a portion of the thermal energy generated as a result of the exothermic decomposition of the organic material. Extraction of a high proportion of the pyroligneous vapour through the lateral wall vent [9] results in a low proportion of pyroligneous vapour ascending to the preceding stages of the reaction vessel [2], resulting in a low proportion of the thermal energy ascending to the preceding stages of the reaction vessel [2]. Conversely, extraction of a low proportion of the pyroligneous vapour through the lateral wall vents results in a higher proportion of the pyroligneous vapour ascending to the preceding stages of the reaction vessel [2], resulting in a higher proportion of thermal energy ascending to the previous stages of the reaction vessel [2].

Pyroligneous vapours are usually extracted from the reactor after they have migrated upwards from warmer layers to cooler layers. As a result, some valuable high boiling point fractions of these vapours are condensed within the cooler layers of material and cannot be extracted from the reactor. Therefore, an additional benefit of extracting the pyroligneous vapours directly from the exothermic reaction zone is that, selected valuable fractions of pyroligneous vapours generated within certain temperature range may be extracted from the reactor through the shortest possible path. Such an arrangement will avoid recycling of these fractions of vapour within the reactor. This mode of operation is advantageous in the situation when the required treatment temperature is below the maximum possible temperature the reactor can develop autogenously and also if some reduction of the charcoal yield in favour of obtaining higher-value liquid products is viable.

As material passes through the cooling zone [23], it is cooled to a desired temperature by heat exchange with cooling gases. Generally the gas is air or mixtures with air. The cooling zone is provided with a perforated-wall cone valve at its bottom to allow the reaction bed to be formed in the reaction vessel and hold up the progression of the organic material until it attains a sufficient level of decomposition to progress to the final product. Charcoal is discharged from the reaction vessel periodically. To discharge the material the outer part of the cone valve slides down and a predetermined amount of charcoal drops into the fixed-volume chamber formed by the cylinder [24] attached to the moving part of the cone valve. When the outer part of the cone valve returns to the upper "closed" position, the charcoal discharged spreads over the bottom of the lover section of the reaction vessel, where it is exposed to the flow of cooling gas. The cooling zone [23] has cooling gas inlets [11] for supplying cooling gas into the reaction bed. As the cooling gas rises through the cooling zone [23], the cooling gas extracts thermal energy from the carbonised organic material through direct heat exchange and becomes heated cooling gas. The carbonised organic material is cooled to the desired temperature by controlling the flow rate of the cooling gas. The heated cooling gas can be extracted through the lateral wall vent [10] in the cooling zone and through the extraction vent [17] in the outer pipe [15] of the lance [12]. The thermal energy in the extracted heated cooling gas can be recovered for use in drying and preheating the organic raw material in the dryer. This increases the energy efficiency of the process. To insure that no cooling gas penetrates into the exothermic reaction zone of the reactor and that there is no reciprocal flow of pyroligneous vapours downwards into the cooling zone [23] the pressures at the cooling gas inlets [11] and the gas and vapour outlet [8] are carefully controlled. The best ratio of the pressures at the inlets [11] and the outlet [8] is considered to be when a very little amount of smoke (aerosol formed by the condensation of pyroligneous vapours) can be observed at the exit of the hot gas outlet [10].

The carbonised organic material is removed from the reaction vessel [2] through at least one charcoal discharge port [13]. In this embodiment, the discharge from the discharge port is controlled by a series of gate valves [14] and the carbonised organic material is discharged into a charcoal carriage [3].

The residence time of the material within the reaction vessel [2] may be optimised in each region as the material progresses through the reaction vessel. This may be achieved by varying the horizontal cross sectional area of the reaction vessel [2]. By inclining the walls of the reactor and/or of the lance to make the horizontal cross section of the reaction vessel [2] either expanding or shrinking as the reaction material progresses through the system, the residence time of every portion of the material with the reaction vessel [2] is as close to the optimal residence time as is practicably possible.

The reaction vessel [2] also comprises a method for monitoring the state variables within the system. The monitored state variables may include the temperature and the pressure at various stages throughout the reaction vessel [2]. The monitored state variables may be used to control the flow of pyroligneous vapours throughout the reaction vessel [2], the flow of the non-reactive gas through the outlet vents [18] of the lance [12], and the flow of the cooling gas through the cooling gas inlets [11] in the cooling zone.

Product Quality Control

The presence of the lance [12] in conjunction with the lateral wall vents [9 and 10] allows the flow of pyroligneous vapours and the temperature to be controlled in both the horizontal and .vertical directions throughout the reaction vessel. This allows a number of product quality control strategies to be realised. These control strategies include, but are not limited to:

(A) Extraction of pyroligneous gases from a chosen temperature zone within the reaction vessel allows products and by-products of a desired quality to be obtained. For example, if it is desirable to maximise the charcoal yield, the pyroligneous gases extracted from selected colder temperature zones of the reaction vessel can be recycled into the higher temperature zones to increase conversion of the pyroligneous gases into charcoal.

(B) If a charcoal product with a high content of volatiles than that produced in a normal operation (e.g. in charcoal with greater flammability, as it may be required for the injection of pulverised carbon into a blast furnace), hot gases from the hot zone of the reactor can be extracted so that the reaction vessel temperature is maintained below a particular value. When producing higher-volatile charcoal, the maximum temperature of the treatment has to be reduced (say, to 450 C). The maximum temperature is the factor primarily affecting the volatile content of the charcoal. The maximum temperature in the reaction zone can be reduced by extracting a fraction of hot pyrolysis vapours through the outlets [22] made to the exothermic reaction zone, therefore extracting heat from that zone. This can be done to certain limits only as the efficiency of pre-heating of the material in the heating zone will be reduced too, however, the reactor should have some spare capacity to withstand medium heat loss, particularly if the maximum required temperature is reduced (e.g. to 450 C). Vapours should be able to flow out through the outlets [22] spontaneously, as their pressure in the exothermic zone is above ambient. However, blowing non-oxidizing gas through the inlet [20] may increase the outflow of vapours from the reactor, if required, or increase the flow of the gas through the heating zone to compensate for the reduced flow of pyrolysis gases/vapours through that zone, if pre-heating becomes insufficient. In this mode of operation the amount of liquid pyrolysis products will be increased in expense of the amount of fixed carbon associated with the charcoal and of the amount of gas. This mode of operation is particularly favourable if the increase in the yield of liquid products is desirable and economically viable.

On the other hand, the reduction of the temperature in the exothermic reaction zone to produce higher-volatile charcoal can be achieved by recycling a fraction of the pyrolysis gases and vapours escaping the reactor from the outlet [8]) back into the reaction zone through the vents [22]. These gases have the temperature of 180 to 200 C and carry pyrolysis vapours (aerosol of pyrolysis tars). Pyrolysis tar aerosols, when injected into the reaction zone, will crack on the surface of fresh hot char (this is an established reaction) and generate additional charcoal. As the vapours extracted from the outlet [8] have the temperature of 180 to 200 C, their injection onto the exothermic reaction zone will reduce the temperature there. At the same time, recycling of the fraction of the pyrolysis gases back into the reaction zone will increase the overall flow rate of gas through the heating zone (as the amount of gas leaving the reactor should stay approximately the same to avoid the pressure build up). As a result, the relative height of the exothermic reaction zone as well as the temperature of the gases leaving the reactor may increase slightly.

(C) If a charcoal product with a low degree of volatiles is required, specific need for a low-volatile charcoal (i.e. for steel re-carburisation), it can be made in the proposed process/reactor by circulating hot nitrogen gas through the same cycle as that for the cooling cycle (described above) .increasing the temperature in the reaction vessel. Hot nitrogen (e.g. at 850 C) should enter the reactor through the inlets [11] and then leave the reactor through the outlets [17] and [19] slightly cooled (to, about 550 C). The maximum temperature of the hot nitrogen may be limited by the hot strength of the materials the reactor is made from. Cooling and conditioning of charcoal produced this way (and the extraction of heat, if desired) should be done in a separate apparatus. This mode of operation is expected to be less energy efficient than the previous mode, but it may be worthwhile when there is a need in small amounts of low-volatile charcoal for special purposes.

As used herein, except where the context requires otherwise the term "comprise" and variations of the term, such as "comprising", "comprises" and "comprised", are not intended to exclude other additives, components, integers or steps.

The invention claimed is:

1. A process for the autogenous production of charcoal, the process comprising:
adding dry organic material to a first end of a reaction vessel whereby the organic material progresses along a flow path through the reaction vessel and is removed from a discharge port at a second end of the reaction vessel;
heating the organic material in a heating zone of the reaction vessel as it progresses through the reaction vessel to a heating reaction zone where the temperature of the organic material has reached a sufficient temperature for exothermic autogenous decomposition of the organic material to occur;
allowing the organic material in the reaction zone to undergo autogenous decomposition into charcoal and pyroligneous gases; and
cooling the charcoal in a cooling zone of the reaction vessel prior to discharge,
wherein pyroligneous gases are removed from a reaction zone outlet in periphery of the reaction vessel such that gases move substantially transversely across the material in the reaction zone towards the reaction zone outlet.

2. The process of claim 1, wherein the external gases are injected through an internal lance into the reaction zone of the reaction vessel.

3. The process of claim 1, wherein cooling gas enters the cooling zone of the reaction vessel through cooling zone inlets at or adjacent to the cooling zone.

4. The process of claim 3, wherein cooling gas heated in the cooling zone of the reaction vessel is removed through cooling zone outlets at or adjacent to the cooling zone of the reaction vessel.

5. The process of claim 4, wherein the cooling zone outlets are positioned on an internal lance.

6. The process of claim 5, wherein at least some of the cooling zone outlets are positioned in the reaction vessel wall fat or adjacent to the cooling zone.

7. The process of claim 3, wherein the cooling zone inlets are positioned on an internal lance in the reaction vessel to provide cooling gas to the cooling zone.

8. The process of claim 1, wherein the process is performed without application of an external heat source to heat the organic material, or for maintaining the temperature of the organic material.

9. The process of claim 1, wherein a portion of the external gases and the pyroligneous gases that are removed from the reaction vessel, are recirculated to the reaction zone.

10. The process of claim 5, wherein the lance is positioned axially in the reaction vessel.

11. The process of claim 1, wherein heat is recovered from the cooling zone to be used elsewhere.

12. The process of claim 11, wherein the recovered heat is used to heat organic material before adding the organic material to the first end of the reaction vessel.

13. An apparatus for the autogenous production of charcoal comprising:
a feeder for supplying a heated organic material to a reaction vessel,
the reaction vessel for supporting a reaction bed of organic material, and
at least one discharge port for discharging thermally decomposed organic material from the reaction vessel, the reaction vessel defining a flow path in which thermal decomposition of the organic material progresses as the organic material progresses through the reaction vessel;
the reaction vessel comprising:
a reaction zone for autogenous pyrolysis reaction of organic material in the reaction bed to form pyroligneous gases and charcoal,
a cooling zone having at least one cooling zone inlet for supplying cooling gas into the reaction bed and at least one cooling zone outlet to extract heated gas from the reaction bed,
at least one lance extending through the reaction bed into the reaction zone to supply a gas into the reaction vessel through a reaction zone inlet in the lance, and
a reaction zone outlet provided in a periphery of the reaction zone to remove gas supplied to the reaction zone by the lance,
wherein the reaction zone outlet is located transversely from the reaction zone inlet such that gases move substantially transversely across the material in the reaction zone towards the reaction zone outlet.

14. The apparatus of claim 13, further comprising a heating zone for heating the organic material by the pyroligneous gases formed in the reaction zone, and a heating zone outlet to extract gases from the heating zone.

15. The apparatus of claim 14, comprising more than one reaction zone outlet to remove gas supplied to the reaction zone by the lance.

16. The apparatus of claim 13, wherein the reaction vessel comprises more than one lance extending through the reaction bed into the reaction zone to supply gas into the reaction vessel.

17. The apparatus of claim 13, wherein at least one of the cooling zone outlets is disposed in the lance.

18. The apparatus of claim 13, wherein the reaction zone inlet is located centrally of the reaction zone.

19. The apparatus of claim 13, wherein the reaction chamber has a cross sectional area which decreases or increases at least at or adjacent to the reaction zone.

20. The apparatus of claim 13, wherein the apparatus does not include an external heat source for heating the bed of organic material, or for maintaining the temperature of the bed of organic material.

* * * * *